Feb. 8, 1955    M. VLOCK    2,701,426
MOUNT FOR X-RAY FILMS OR RADIOGRAPHS
Filed Aug. 18, 1953    2 Sheets-Sheet 1
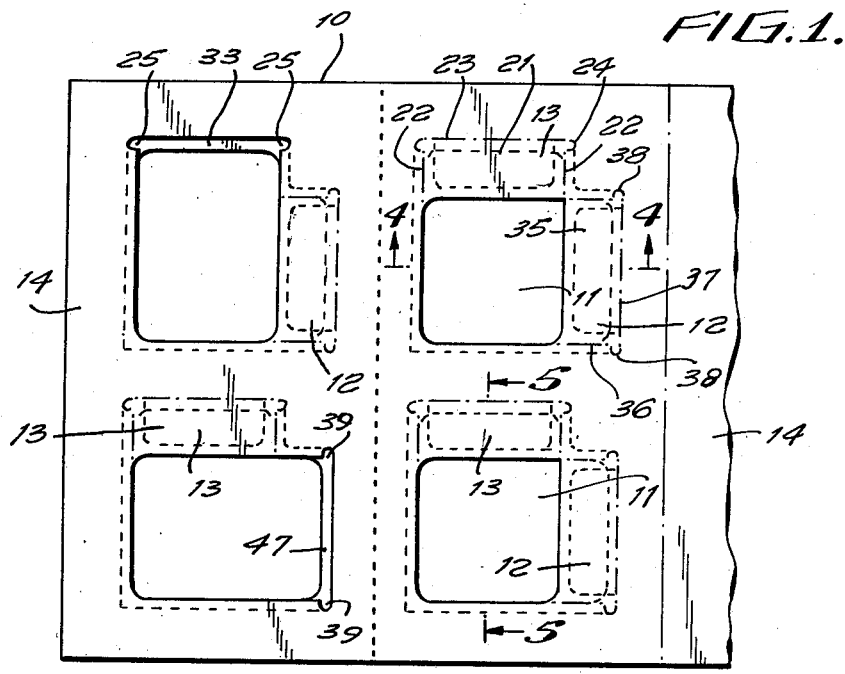
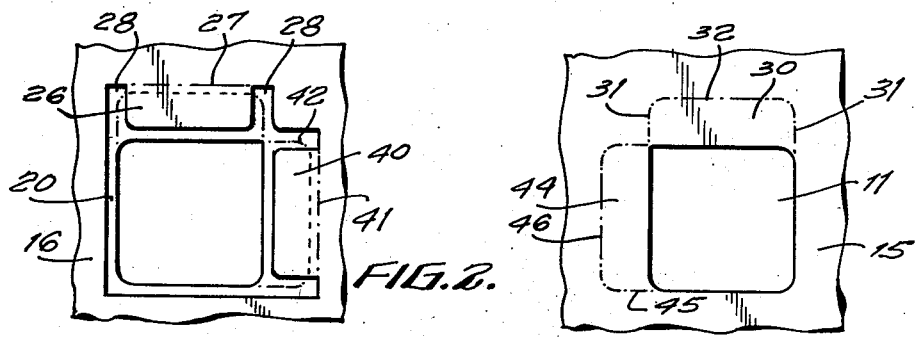
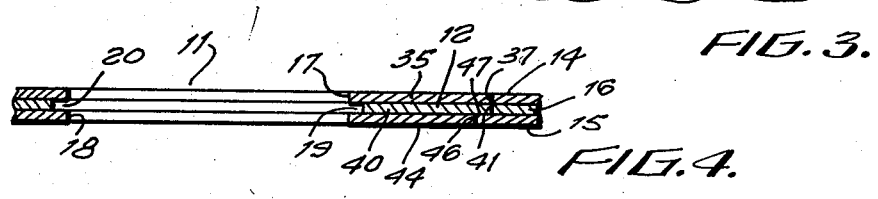
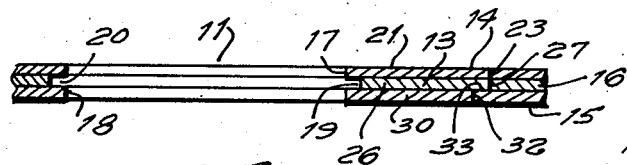
INVENTOR
MARK VLOCK
BY Clark & Ott
ATTORNEYS United States Patent Office 2,701,426
Patented Feb. 8, 1955

2,701,426

MOUNT FOR X-RAY FILMS OR RADIOGRAPHS

Mark Vlock, Bronx, N. Y.

Application August 18, 1953, Serial No. 374,908

7 Claims. (Cl. 40—159)

This invention relates to a mount for X-ray films or radiographs of the teeth.

An object of the invention is to provide a mount for X-ray films or radiographs of the teeth which are retained in position for facilitating viewing thereof by means of a light placed at the rear.

Another object of the invention is to provide a mount of said character for receiving any desired number of X-ray films or radiographs of the teeth for any one individual and in which the films or radiographs may be mounted with the length thereof disposed either horizontally or vertically.

Still another object of the invention is to provide a mount of said character having tearable portions which may be removed for enlarging the openings transversely and vertically through which the films or radiographs are viewed and which tearable portions serve to block out the light and provide guide means for the films or radiographs when retained in position in the mount.

Heretofore it has been the practice to employ separate mounts arranged for receiving X-ray films or radiographs with the length thereof disposed horizontally or vertically respectively, that is, one of the mounts is arranged for receiving X-ray films with the length disposed horizontally and another mount is arranged for receiving X-ray films with the length thereof disposed vertically. In some instances, mounts have been employed in which portions are arranged for receiving the films with the length thereof disposed horizontally and other portions arranged for receiving the films with the length thereof disposed vertically. This has required a great many different types of mounts to meet the individual preference of the physician or dentist for taking X-ray films or radiographs of the teeth with the length of the teeth arranged either horizontally or vertically. An object of the present invention therefore, is to provide a mount in which any number of X-ray films or radiographs may be mounted for any one patent and in which any one of the films may be disposed either horizontally or vertically.

With the foregoing and other objects in view, reference is now made to the following specification and accompanying drawings in which the preferred embodiments of the invention are illustrated.

In the drawings:

Fig. 1 is a fragmentary face view of a mount embodying the invention for holding a plurality of X-ray films or radiographs arranged either horizontally or vertically.

Fig. 2 is a fragmentary face view of a portion of the mount for receiving one X-ray film or radiograph with the top ply removed.

Fig. 3 is a fragmentary rear face view showing a portion of the mount for receiving one X-ray film or radiograph.

Fig. 4 is an enlarged fragmentary horizontal sectional view taken approximately on line 4—4 of Fig. 1.

Fig. 5 is an enlarged fragmentary vertical sectional view taken approximately on line 5—5 of Fig. 1.

Figure 6:
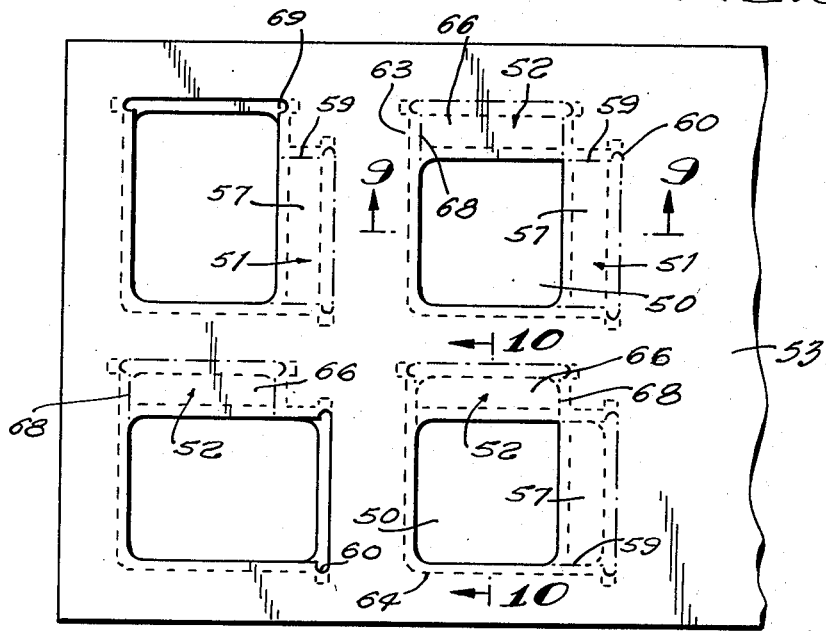
Fig. 6 is a fragmentary face view of a mount embodying a modified form of the invention for holding a plurality of X-ray films or radiographs arranged either horizontally or vertically.

Referring to the drawings by characters of reference, and more particularly to the form of the invention illustrated in Figs. 1 to 5 inclusive of the drawings, the mount includes a panel 10 which is made up of any desired length for receiving any number of X-ray films or radiographs of the teeth which may be desired by a dentist or physician for any one patient. The X-ray films or radiographs may be mounted on the panel either horizontally or vertically and the panel blocks out light rays from the rear except through openings for viewing the films or radiographs.

The panel 10 is formed with vertically and horizontally arranged rows of openings 11, each of which is adapted to be enlarged either horizontally or vertically by the removal of tearable panel portions 12 and 13 for disposing an X-ray film or radiograph either horizontally or vertically at each of said openings. The panel is composed of a plurality of plies and in the form shown includes a top ply 14, a bottom ply 15 and an intermediate ply 16 which are secured together to provide a relatively stiff structure. The openings 11 in the panel extend through the plies and are indicated respectively by the reference characters 17, 18 and 19. The openings 17 and 18 in the top and bottom plies are of the same size, while the openings 19 in the intermediate ply are somewhat larger in width and length than the openings in the other plies so as to form recesses 20 between the plies.

The top ply 14 is formed with rectangular-shaped tearable portions 21 which border the upper edges of the openings 17 respectively and are defined by weakened lines 22 at the ends thereof and weakened horizontal lines 23 respectively, the weakened end lines 22 being connected with the weakened horizontal lines 23 by weakened curved lines 24 which form notches 25 when the tearable portions 21 are removed. The intermediate ply 16 includes tearable portions 26 which border the upper edges of the openings 19 and which underlie the tearable portions 21 of the top ply and are secured thereto. The tearable portions 26 are defined by weakened horizontal lines 27 and by recesses 28 at the ends thereof which are continuations of the recesses 20 at the opposite sides of the openings 19. The bottom ply 15 includes tearable portions 30 which border the upper edges of the openings 18 and underlie the tearable portions 26 of the intermediate ply and are secured thereto. The tearable portions 30 are defined by weakened lines 31 at the ends thereof and by weakened horizontal lines 32 respectively. The weakened lines 22 and 31 in the top and bottom plies and the recesses 28 in the intermediate ply are disposed in alignment while the weakened horizontal lines 32 in the bottom ply are offset with reference to the weakened lines 23 and 27 in the top and intermediate plies to thereby provide ledges 33 at the upper ends of the openings when the tearable portions are removed.

Constructed in this manner, the tearable panel portions 13 made up of the tearable portions 21, 26 and 30 are removable together for enlarging the openings 11 for receiving X-ray films or radiographs with the length thereof disposed vertically. The X-ray films or radiographs are inserted between the top and bottom plies with the edges thereof inserted through the notches 25 and when positioned therebetween, the edge portions of the X-ray films or radiographs engage in the recesses 20 and on the ledges 33 at the upper ends of the enlarged openings.

The top ply 14 is also formed with rectangular-shaped tearable portions 35 which border the openings 17 at one side thereof and are defined by weakened lines 36 at the ends thereof and by weakened vertical lines 37 respectively, the weakened lines 36 being connected with the weakened vertical lines 37 by weakened curved lines 38 which form notches 39 when the tearable portions 35 are removed. The intermediate ply 16 also includes tearable portions 40 which border the openings 19 at one side thereof and which underlie the tearable portions 35 of the top ply and are secured thereto. The tearable portions 40 are defined by weakened vertical lines 41 and by recesses 42 at the ends thereof which recesses are continuations of the recesses 20 at the opposite ends of the openings 19. The bottom ply 15 also includes tearable portions 44 which border the openings 18 at one side thereof and underlie the tearable portions 40 and are secured thereto. The tearable portions 44 are defined by weakened lines 45 at the ends thereof and by weakened vertical lines 46 respectively. The weakened lines 36 and 45 in the top and bottom plies and the recesses 42 in the intermediate ply are disposed in alignment, while the weakened vertical lines 46 in the bottom ply are offset with reference to the weakened vertical lines 37 and 41 in the top and intermediate plies to thereby provide ledges 47 at one end of the openings respectively when the tearable portions are removed.

The tearable panel portions 12 made up of the tearable ply portions 35, 40 and 44 are removable together for enlarging the openings 11 in the panel for receiving X-ray films or radiographs with the length thereof disposed horizontally. The X-ray films or radiographs are inserted between the top and bottom plies with the edges thereof engaging through the notches 38 and when positioned between the plies the edge portions of the X-ray films or radiographs engage in the recesses 20 and on the ledges 47 at the ends of the enlarged openings.

It will be understood that when the X-ray films or radiographs are disposed with the length thereof arranged vertically, the tearable panel portions 12 will remain in place so as to block out the light at the rear of the panel for viewing the X-ray films or radiographs through the enlarged openings. The X-ray films or radiographs will also engage in the recesses 20 in the tearable panel portions 12 for retaining the X-ray films or radiographs in position. Similarly, when the X-ray films or radiographs are arranged horizontally, the tearable panel portions 13 will remain in position and function to block out the light at the rear of the panel for viewing the X-ray films or radiographs through the enlarged openings. The X-ray films or radiographs also engage in the recesses 20 in the tearable panel portions 13 for retaining the X-ray films or radiographs in position.

Figure 9:
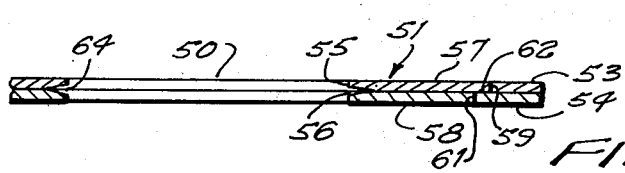
Fig. 9 is an enlarged fragmentary horizontal sectional view taken approximately on line 9—9 of Fig. 6.
Figure 10:
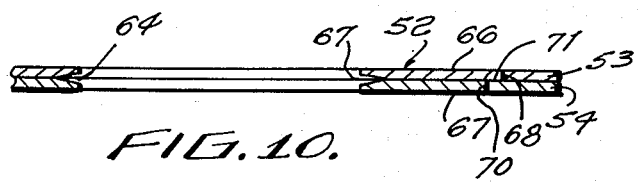
Fig. 10 is an enlarged fragmentary vertical sectional view taken approximately on line 10—10 of Fig. 6.

Instead of the three ply panel as illustrated in the aforesaid form of the invention, the panel may be made up of two plies as illustrated in Figs. 6 to 10 of the drawings. In this form of the invention, the panel is of any desired length for receiving any number of X-ray films or radiographs, which may be mounted either horizontally or vertically. The panel is formed with vertically and horizontally arranged rows of openings 50 each of which is adapted to be enlarged either horizontally or vertically by the removal of tearable panel portions 51 and 52 for disposing an X-ray film or radiograph either horizontally or vertically at each of the openings. The panel includes a top ply 53 and a bottom ply 54 which are secured together to provide a relatively stiff panel. The openings 50 extend through the panel and are indicated by the reference characters 55 and 56 in the plies respectively. The top and bottom plies 53 and 54 are formed with rectangular shaped tearable portions 57 and 58 which together form the tearable panel portions 51, the tearable portions 57 in the top ply being defined by weakened lines 59 extending about three sides thereof and forming notches 60 when the said tearable portions are removed. The tearable portions 58 in the lower ply are defined by weakened lines 61 extending about three sides thereof. The tearable portions 57 and 58 of the plies are of the same length while the tearable portions 58 are of lesser width so as to provide ledges 62. The plies are not secured together a short distance inwardly of the openings 50 and adjacent the ends of the tearable panel portions 51 and 52 as indicated by the broken lines 63 in Figs. 6 to 8 of the drawings so that the plies may be spread apart to provide recesses 64 for receiving the X-ray films or radiographs as illustrated in Figs. 9 and 10 of the drawings. The X-ray films or radiographs are inserted between the plies through the notches 60 and when positioned therebetween the edge portions of the X-ray films or radiographs engage in the recesses 64 and on the ledges 62 at one end of the enlarged openings when the panel portions 51 are removed.

The top and bottom plies 53 and 54 are also formed with rectangular-shaped tearable portions 66 and 67 which together form the tearable panel portions 52, the tearable portion 66 in the top ply being defined by weakened lines 68 extending about three sides thereof and forming notches 69 when the tearable portions are removed. The tearable portions 67 in the lower ply are defined by weakened lines 70 which extend about three sides thereof. The tearable portions 66 and 67 are of the same length while the tearable portions 67 are of lesser width so as to provide ledges 71. As hereinbefore described, the recesses 64 extend between the tearable portions 66 and 67 bordering the openings 50 and also extend along the ends thereof.

Figures 7, 8:
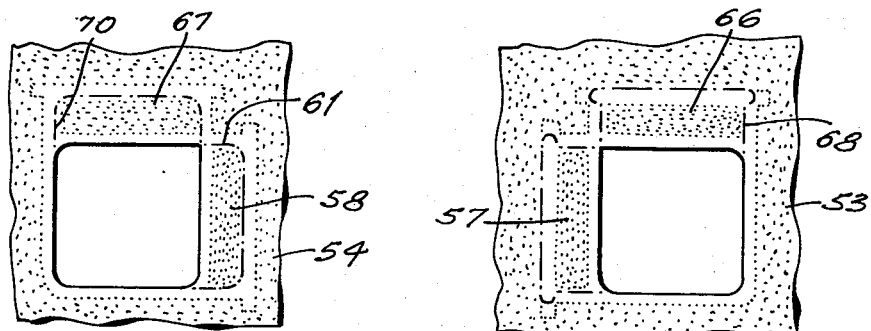
Fig. 7 is a fragmentary face view of a portion of the mount for receiving one X-ray film or radiograph with the top ply removed.
Fig. 8 is a fragmentary rear face view showing a portion of the mount for receiving one X-ray film or radiograph, with the bottom ply removed.

The plies together with the tearable portions in each of the forms are adhesively secured together and in Figs. 7 and 8 of the two ply form the upper and lower plies are stippled to indicate the areas coated by the adhesive for securing the plies together. The said figures also show unstippled areas which are without the adhesive and which provide the recesses 64 between the plies.

While the preferred forms of the invention are shown and described herein, it is to be understood that the same is not so limited but shall cover and include any and all modifications thereof which fall within the scope of the invention.

What is claimed is:

1. A mount for X-ray films consisting of a panel composed of a plurality of plies secured together to provide a relatively stiff structure, said panel having openings through which light rays may pass for viewing the films, said panel having tearable portions bordering each of said openings defined by weakened lines in the plies, and said panel having recesses between the plies bordering the openings therein and bordering the ends of said tearable portions and opening through the panel for receiving a film therein at each of the openings when either one of the tearable portions at said openings respectively is removed.

2. A mount for X-ray films consisting of a panel composed of a plurality of plies secured together to provide a relatively stiff structure, said panel having openings through which light rays may pass for viewing the films, said panel having tearable portions bordering adjacent sides of each of said openings defined by weakened lines in the plies, and said panel having recesses between the plies extending about the four sides of the openings therein and bordering the ends of said tearable portions and opening through the panel for receiving a film therein at each of the openings when either one of the tearable portions at said openings respectively is removed.

3. A mount for X-ray films consisting of a panel composed of a plurality of plies secured together to provide a relatively stiff structure, said panel having openings through which light rays may pass for viewing the films, said panel having a tearable portion bordering one edge of each of the openings defined by weakened lines in the plies for enlarging the openings vertically, said panel having tearable portions bordering another edge of each of said openings defined by weakened lines in the plies for enlarging the openings horizontally, and said panel having recesses between the plies bordering the sides of the openings therein and extending along the end edges of said tearable portions for receiving a film therein at each of the enlarged openings when either one of the tearable portions at said openings respectively is removed.

4. A mount for X-ray films consisting of a panel composed of a plurality of plies secured together to provide a relatively stiff structure, said panel having an opening through which light rays may pass for viewing the film, said panel having tearable portions bordering said opening defined by weakened lines in the plies, and said panel having recesses between the plies bordering the sides of the opening therein and extending along the end edges of said tearable portions for receiving a film therein at said opening when either one of the tearable portions is removed.

5. A mount for X-ray films consisting of a panel, said panel having openings through which light rays may pass for viewing the films, said panel having tearable portions bordering adjacent sides of each of said openings defined by weakened lines, said panel having recesses extending inwardly along the four sides of said openings and bordering the ends of the tearable portions and opening through the panel for receiving a film therein at each of the openings when either one of the tearable portions at said openings respectively is removed.

6. A mount for X-ray films consisting of a panel composed of top and bottom plies and an intermediate ply which are secured together to provide a relatively stiff panel, said panel having openings extending through the plies for viewing a film at each of said openings in the panel, said panel having a tearable portion bordering one edge of each of the openings defined by weakened lines in the plies for enlarging the openings in one direction, said panel having tearable portions bordering another edge of each of said openings defined by weakened lines in the plies for enlarging the openings in angular relation to the aforementioned direction, the said openings in the said intermediate ply being larger than the openings in the other plies to provide recesses between the top and bottom plies bordering the sides of the openings therein and bordering the ends of the tearable portions, and said tearable portions providing notches in the top ply when the tearable portions are removed for inserting a film in said recesses at each of the openings in the panel when either one of the tearable portions at the openings respectively is removed.

7. A mount for X-ray films consisting of a panel composed of top and bottom plies which are secured together to provide a relatively stiff panel, said panel having openings extending through the plies for viewing a film at each of said openings in the panel, said panel having a tearable portion bordering one edge of each of the openings defined by weakened lines in the plies for enlarging the openings in one direction, said panel having tearable portions bordering another edge of each of the openings defined by weakened lines in the plies for enlarging the openings in angular relation to the aforementioned direction, said top and bottom plies being unsecured adjacent the openings therein and adjacent the ends of said tearable portions whereby the plies may be spread apart to form recesses between the plies bordering the sides of the openings therein and bordering the ends of the tearable portions, and said tearable portions providing notches in the top ply when the tearable portions are removed for inserting a film in said recesses at each of the openings in the panel when either one of the tearable portions at the openings respectively is removed.

References Cited in the file of this patent

UNITED STATES PATENTS

| | | |
|---|---|---|
| 2,127,940 | Rinn | Aug. 23, 1938 |
| 2,334,176 | De Sherbinin | Nov. 16, 1943 |

FOREIGN PATENTS

| | | |
|---|---|---|
| 27,472 | Great Britain | Dec. 3, 1906 |